(12) United States Patent
Brooker et al.

(10) Patent No.: US 10,649,749 B1
(45) Date of Patent: May 12, 2020

(54) CROSS-ENVIRONMENT APPLICATION OF TRACING INFORMATION FOR IMPROVED CODE EXECUTION

(71) Applicant: Amazon Technologies, Inc., Seattle, WA (US)

(72) Inventors: Marc John Brooker, Seattle, WA (US); Mikhail Danilov, Sammamish, WA (US); Tobias Holgers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 16/019,384

(22) Filed: Jun. 26, 2018

(51) Int. Cl.
G06F 9/44 (2018.01)
G06F 8/41 (2018.01)
G06F 11/36 (2006.01)
G06F 9/455 (2018.01)
G06F 11/34 (2006.01)

(52) U.S. Cl.
CPC ............ G06F 8/443 (2013.01); G06F 9/4552 (2013.01); G06F 11/3466 (2013.01); G06F 11/3628 (2013.01); G06F 11/3636 (2013.01); G06F 11/3664 (2013.01)

(58) Field of Classification Search
None
See application file for complete search history.

(56) References Cited

U.S. PATENT DOCUMENTS

| | | | | |
|---|---|---|---|---|
| 8,201,026 B1 * | 6/2012 | Bornstein | ........... | G06F 9/45508 714/45 |
| 9,086,924 B2 * | 7/2015 | Barsness | ............... | G06F 9/4843 |
| 10,503,626 B2 * | 12/2019 | Idicula | ................ | G06F 11/3024 |
| 2004/0019886 A1 * | 1/2004 | Berent | .................... | G06F 8/447 717/158 |
| 2007/0226700 A1 * | 9/2007 | Gal | ........................... | G06F 8/52 717/128 |
| 2011/0265067 A1 * | 10/2011 | Schulte | ................... | G06F 8/456 717/148 |
| 2012/0204164 A1 * | 8/2012 | Castanos | ................ | G06F 8/443 717/153 |

(Continued)

OTHER PUBLICATIONS

Ha et al., A Concurrent Trace-based Just-In-Time Compiler for Single-threaded JavaScript, utexas.edu (Year: 2009).*

*Primary Examiner* — Insun Kang
(74) *Attorney, Agent, or Firm* — Knobbe, Martens, Olson & Bear, LLP

(57) ABSTRACT

Systems and methods are described for enabling cross-environment application of tracing information for code, such as code executed within an on-demand (or "serverless") code execution system. Various optimizations exist that allow execution of code to proceed faster or more efficiently over time, by collecting tracing information regarding the execution and using that tracing information to guide compilation of the code. These optimizations are typically designed for long-lived environments. However, executions within an on-demand code execution system often occur in short-lived environments, reducing or eliminating any gains from these optimizations. To address this issue, tracing information can be maintained across multiple environments on the system, allowing subsequent executions to be optimized based on tracing information of prior executions in other environments.

20 Claims, 6 Drawing Sheets

(56) References Cited

U.S. PATENT DOCUMENTS

| | | | |
|---|---|---|---|
| 2013/0061212 A1* | 3/2013 | Krause | G06F 9/45516 |
| | | | 717/128 |
| 2013/0346952 A1* | 12/2013 | Huang | G06F 8/443 |
| | | | 717/148 |
| 2014/0101643 A1* | 4/2014 | Inoue | G06F 8/4441 |
| | | | 717/156 |
| 2015/0324174 A1* | 11/2015 | Bromley, Jr. | G06F 8/30 |
| | | | 717/107 |
| 2016/0364316 A1* | 12/2016 | Bhat | G06F 11/3636 |
| 2018/0285101 A1* | 10/2018 | Yahav | G06F 8/53 |
| 2018/0341504 A1* | 11/2018 | Kissell | G06F 9/45516 |
| 2019/0235848 A1* | 8/2019 | Swiecki | G06F 8/447 |
| 2019/0303117 A1* | 10/2019 | Kocberber | G06F 8/48 |
| 2019/0361802 A1* | 11/2019 | Li | G06F 8/436 |

\* cited by examiner

CROSS-ENVIRONMENT APPLICATION OF TRACING INFORMATION FOR IMPROVED CODE EXECUTION

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
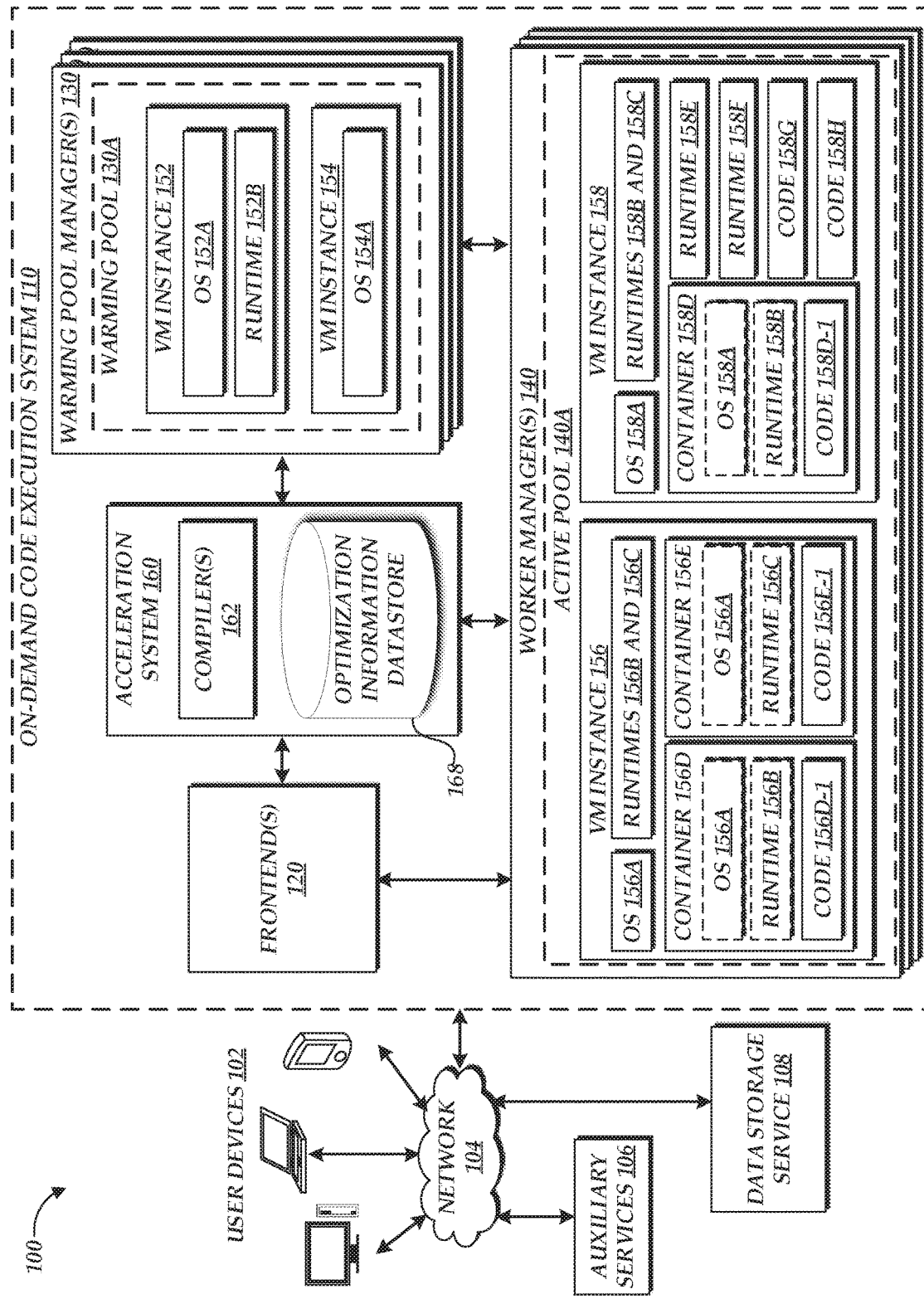
FIG. 1 is a block diagram depicting an illustrative environment in which an on-demand code execution system can operate to execute tasks corresponding to code, which may be submitted by users of the on-demand code execution system, and to enable cross-environment application of tracing information to improve execution of that code.

Generally described, aspects of the present disclosure relate to an on-demand code execution system, which may also be referred to as a "serverless" execution system. The on-demand code execution system enables rapid execution of source code, which may be supplied by users of the on-demand code execution system. The on-demand code execution system facilitates such execution, for example, by interpreting or compiling the source code, and executing a resulting representation of the code (often machine code) within an execution environment. The on-demand code execution system may also facilitate generation of that environment, and deletion of that environment on completing execution of the source code. In one embodiment, execution of source code occurs rapidly (e.g., in under 500 milliseconds (ms)), and thus the lifetime of an execution environment may be comparatively short. While this may provide benefits to the on-demand code execution system, such as a reduction in computing resources required to execute source code, the short lifetime of an execution environment may also prevent or inhibit execution optimization techniques originally conceived for long-running environments. One such optimization technique is tracing-based just-in-time (JIT) compilation. This technique, which is generally known in the art, utilizes trace information collected during execution of a program to guide future JIT compilation for the program. This technique can greatly increase the speed of execution of source code, by reducing the need to interpret that source code during execution or by enabling other compilation optimizations. However, traditional tracing-based JIT compilation operates solely within a given execution environment, and typically during a single execution of source code. Moreover, traditional tracing-based JIT compilation generally only provides benefits after a sufficient amount of tracing information is collected, which can often take significant amounts of time (e.g., thousands of executions of a given portion of code). This time is sometimes referred to as "JIT warmup" time. During JIT warmup, execution of code can actually be slowed relatively to a device not utilizing tracing-based JIT compilation, as such compilation requires additional computing resources to conduct tracing and optimization. For this reason, the benefits of tracing-based JIT compilation are often realized only in long-running environments, and use of this technique in short-lived environments can actually be detrimental. The rapid construction and deconstruction of execution environments, such as might occur within the on-demand code execution system, can thus prevent gains in efficiency from tracing-based JIT compilation. The present disclosure addresses this problem in traditional tracing-based JIT compilation by enabling cross-environment application of tracing information, thus enabling the benefits of traditional tracing-based JIT compilation within short-lived execution environments.

Specifically, and as will be described in more detail below, aspects of the present disclosure enable tracing information gathered during execution of source code in a first execution environment on an on-demand code execution system to be used to more efficiently execute the code in a second execution environment. In one embodiment, a device implementing a first environment may operate, during execution of source code, to conduct tracing of the execution. Tracing may occur, for example, due to operation of a tracing JIT compiler within the first environment, in accordance with traditional tracing-based JIT optimization. However, unlike traditional tracing-based JIT optimization, the tracing information may be made available to a second execution environment. For example, the device implementing the first environment may submit the tracing information to an acceleration service of the on-demand code execution system. The acceleration service may then make the tracing information collected during operation of the first execution environment available to a second execution environment executing the same source code. Illustratively, the acceleration service may cause the tracing information to be placed into memory accessible to the second execution environment (e.g., persistent memory such as a hard-disk drive or non-persistent memory such as random access memory (RAM)). A JIT compiler operating within the second execution environment may then reference the tracing information of the first execution environment as if that information were created within the second execution environment. In this way, operation of the JIT compiler within the second execution environment may be "jump started" with the tracing information of the first execution environment, enabling the JIT compiler of the second execution environment to reach a stage of code optimization more quickly than if the JIT compiler of the second execution environment were itself to generate all tracing information used for code optimization. Thus, by transmission of tracing information between execution environments, tracing-based JIT compilation can be enabled even for short-lived environments.

Additionally or alternatively to sharing of tracing information between environments, the on-demand code execution system of the present disclosure may utilize tracing information gathered during execution of source code within a first environment to implement other code optimization techniques for source code to be executed in a second execution environment. Illustratively, the acceleration service of the on-demand code execution system may utilize tracing information gathered during execution of source code within a first environment to conduct guided ahead-of-time (AOT) compilation of the source code. Generally, AOT compilation stands in contract to JIT compilation, in that it occurs prior to execution of the source code. This technique may reduce the computing resources needed to execute code, as some portion of compilation for the code has already occurred. AOT compilation generally occurs without reference to information gathered during execution of code (generally referred to as "runtime" information), thus forgoing many of the beneficial optimizations that occur in JIT compilation. However, in accordance with aspects of the present disclosure, an acceleration service may conduct AOT compilation for source code based on tracing information gathered during a past execution of that source code within an execution environment. This technique may thus enable AOT compilation to integrate optimizations typically possible only during JIT compilation, combining the benefits of AOT and JIT compilation. Machine code generated by the acceleration service can then be provided to subsequent execution environments, thus reducing the need for JIT optimizations within the subsequent execution environments and speeding execution of the code.

In yet another embodiment of the present disclosure, in addition or as an alternative to transfer of tracing information between environments, the efficiency of execution of code within a second environment can be increased by transfer of machine code generated within a first execution environment to the second environment. Illustratively, a JIT compiler within a first execution environment may operate, during execution of source code, to generate machine code for one or more portions of the source code (e.g., as guided by tracing information gathered within the first execution environment). In accordance with traditional tracing-based JIT optimization, machine code may allow the source code to execute more quickly, by reducing a need to interpret portions of the source code (which portions can instead be directly executed in their machine code representation). However, in traditional tracing-based JIT optimization, machine code generated during execution of source code is generally machine-dependent, and as such is not used in execution of the source code within other execution environments. In accordance with the present disclosure, this machine code generated within a first environment may be transmitted to an acceleration service, which may in turn provision subsequent execution environments with the machine code. Thus, rather than being required to itself generate machine code for the source code, a device implementing the second environment may directly utilize the machine code of the first environment to execute the source code. To ensure the validity of the machine code of the first environment to the second environment, the on-demand code execution system may be configured to ensure that the second environment matches an architecture of the first environment. For example, the on-demand code execution system may ensure that the second environment operates on a common operating system and processor architecture (e.g., as a real physical architecture or virtual architecture) with the first environment.

Tracing JIT compilers exist for a variety of languages, and as such source code of the present disclosure may be expressed in a variety of languages. For example, source code of the present disclosure may be expressed as Java, JavaScript, Python, or CIL language code. Examples of the present disclosure may be provided with respect to individual languages. It should be understood that such examples are provided for illustration only.

While aspects of the present disclosure may refer to non-machine code generally as "source code," which may include human-readable computer code, it should be understood that the term source code, as used herein, may also refer to device-independent representation of source code, such as an "intermediate representation" of the source code. Generally described, an intermediate representation of source code can be a data structure or code which accurately represents source code, but may be more readily manipulated by a computing device (e.g., to conduct optimizations). Intermediate representations are generally device-independent, and represent instructions at a higher level than device-dependent code, such as machine code. Examples of intermediate representations include Java bytecode or .NET Framework Common Intermediate Language (CIL) code.

Various techniques described herein, such as trace-based JIT compilation, may occur with respect to an intermediate representation of source code.

As will be appreciated by one of skill in the art in light of the present disclosure, the embodiments disclosed herein improves the ability of computing systems, such as on-demand code execution systems, to execute source code. Specifically, aspects of the present disclosure reduce the computing resources required to execute source code within multiple execution environments, by utilizing information (e.g., tracing information or machine code generated based on tracing information, which may collectively be referred to herein as "optimization information") from a first execution environment to assist in execution of code within a second execution environment. Aspects of the present disclosure further speed the execute of code in the second environment due to the use of such optimization information between environments. Moreover, the presently disclosed embodiments address technical problems inherent within computing systems; specifically, the limited resources of computers to execute code, and the transitive, device-specific nature of optimization information generated according to traditional techniques. These technical problems are addressed by the various technical solutions described herein, including the utilization of optimization information (e.g., tracing information or machine code generated based on tracing information) across execution environments. Thus, the present disclosure represents an improvement on existing code execution systems and computing systems in general.

The general execution of tasks on the on-demand code execution system will now be discussed. As described in detail herein, the on-demand code execution system may provide a network-accessible service enabling users to submit or designate computer-executable source code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable source code (e.g., including metadata identifying dependency code objects for the uploaded code), invoking the user-provided source code (e.g., submitting a request to execute the source code on the on-demand code execution system 110), scheduling event-based jobs or timed jobs, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the on-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be invoked by code execution on the on-demand code execution system 110, such as by API calls to the auxiliary services 106. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as source code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide source code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable source code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks," while specific executions of that code are referred to as "task executions" or simply "executions." Source code for a task may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the source code (or the location thereof) to be executed and one or more arguments to be used for executing the source code. For example, a call may provide the source code of a task along with the request to execute the task. In another example, a call may identify a previously uploaded task by its name or an identifier. In yet another example, source code corresponding to a task may be included in a call for the task, as well as being uploaded in a separate location (e.g., storage of an auxiliary service 106 or a storage system internal to the on-demand code execution system 110) prior to the request being received by the on-demand code execution system 110. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the source code and any libraries (and/or identifications of storage locations thereof) corresponding to the task requested for execution. In some embodiments, the call includes metadata that indicates the source code of the task to be executed, the language in which the source code is written, the user associated with the call, and/or the computing resources (e.g., memory, etc.) to be reserved for executing the source code. For example, the source code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code sets may also be associated with permissions or authorizations. For example, a third party may submit a code object and designate the object as readable by only a subset of users. The on-demand code execution system 110 may include functionality to enforce these permissions or authorizations with respect to code sets.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential source code of a task may be written. For example, such languages may include Java, JavaScript, Python, Ruby, and the like. In some embodiments, the set of languages that the source code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the runtimes may also be user provided. A runtime—sometimes referred to as a runtime system—generally includes a set of software designed to support execution of source code written in a given computer language. In accordance with the present disclosure, the runtime may include a JIT compiler configured to implement a variety of trace-based optimization techniques. The runtime may further include an interpreter or other system to enable execution of the source code without or in cooperation with the JIT compiler. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the source code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the source code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the source code of the task is loaded on a container in the active pool 140 at the time the request is received; (2) the source code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

In accordance with embodiments of the present disclosure, the on-demand code execution system 110 may further include an acceleration system 162 configured to enable use of tracing information to assist in execution of source code across execution environments. Illustratively, the acceleration system 162 may collect tracing information generated during execution of source code within a first execution environment (e.g., a specific virtual machine or container), and make that information available to a second execution environment. In some instances, the acceleration system 162 may additionally or alternatively conduct AOT compilation for source code based on tracing information related to a past executions, to generate machine code for the task. The acceleration system 162 may contain one or more compilers 162 to conduct such execution. Furthermore, the acceleration system 160 may in some instances collect compiled machine code generated within a first execution environment (e.g., based on execution of a tracing JIT compiler within the first execution environment) and make such code available to other execution environments, such that those other environments may execute code of a task on the basis of the machine code, rather than being required to themselves interpret or compile source code for the task. Data include tracing information, machine code generated due to AOT compilation, or machine code generated during execution of a task in an execution environment (which data is collectively referred to herein as "optimization information") can be stored within an optimization information datastore 168. The optimization information datastore 168 can be implemented as any one or more of a hard disk drive (HDD), solid state drive (SSDs) virtual disk drive, tape drives network attached storage (NAS) device, or any other persistent or substantially persistent storage component. While shown as part of the acceleration system 160, the acceleration system 160 may additionally or alternative implement the optimization information datastore on the data storage service 108.

While some functionalities are generally described herein with reference to an individual component of the on-demand code execution system 110, other components or a combination of components may additionally or alternatively implement such functionalities. For example, a worker manager 140 may operate to facilitate sharing of optimization information across execution environments, to conduct AOT compilation of source code based on tracing information gathered from an execution environment, etc., in a manner similar or identical to as described herein with reference to an acceleration system 160.

Figure 2:
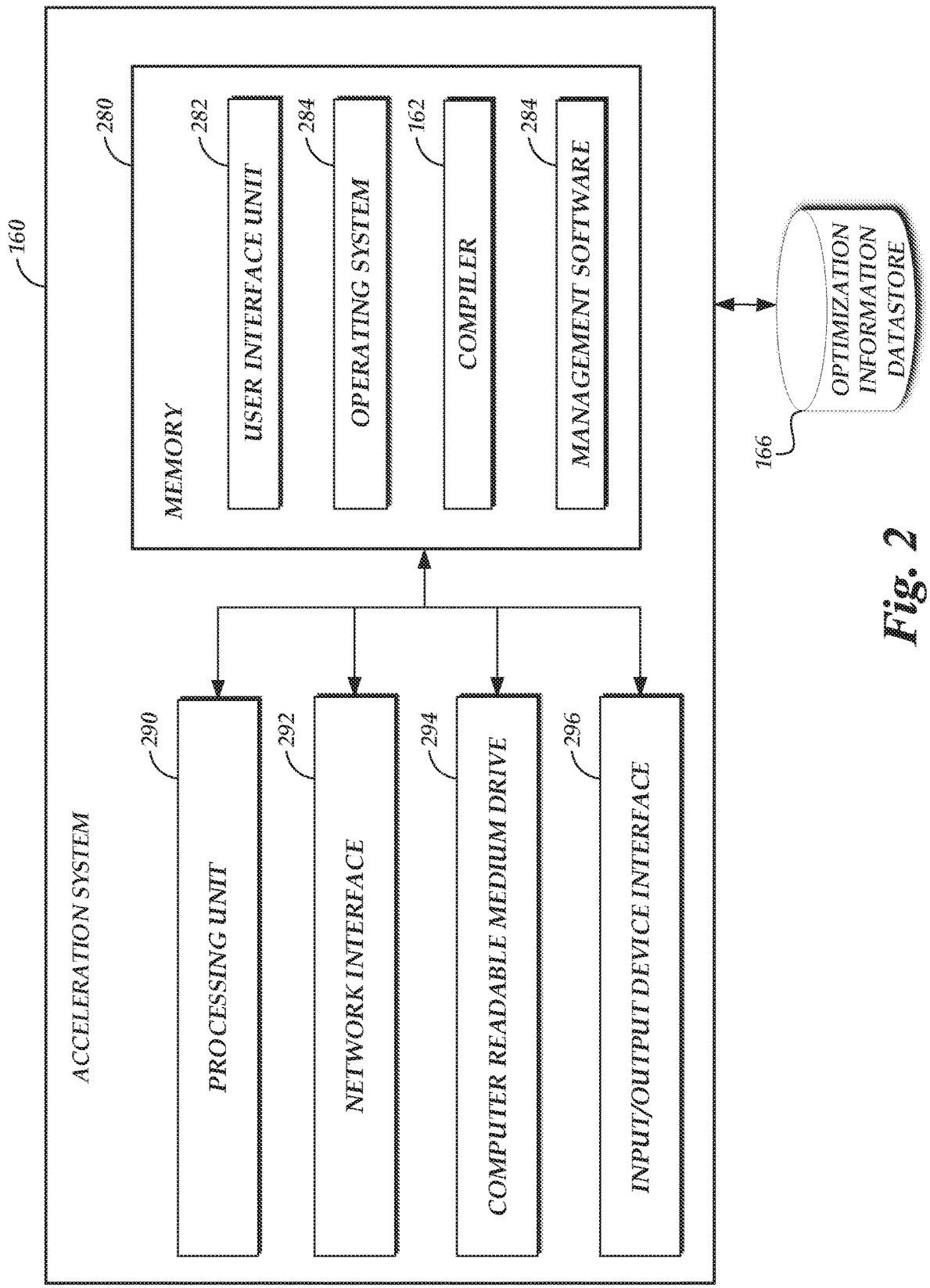
FIG. 2 depicts a general architecture of a computing device providing an acceleration system that is configured to facilitate cross-environment application of tracing information for code of tasks on the on-demand code execution system of FIG. 1.

FIG. 2 depicts a general architecture of a computing system (referenced as acceleration system 160) that operates to facilitate cross-environment application of tracing information on the on-demand code execution system. The general architecture of the acceleration system 160 depicted in FIG. 2 includes an arrangement of computer hardware and software modules that may be used to implement aspects of the present disclosure. The hardware modules may be implemented with physical electronic devices, as discussed in greater detail below. The acceleration system 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the code analysis system 160 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the code analysis system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a compiler 162 and management software 284 that may be executed by the processing unit 290. In one embodiment, the compiler 162 and management software 284 implement various aspects of the present disclosure. For example, the management software 284 may include computer code executable to manage optimization information on the on-demand code execution system 110 (e.g., tracking which optimization information is available generated for a given task). The compiler 162 may include code executable to conduct AOT compilation of source code based on tracing information related to execution of the source code within an execution environment on the on-demand code execution system. In this regard, the compiler 162 may operate in a manner similar to a tracing JIT compiler, albeit in an AOT, rather than JIT, fashion as well as on the basis of tracing information gathered during a past execution in a separate execution environment, rather than on the basis of currently gathered tracing information (as in a tracing JIT compiler). In one embodiment, the compiler 162 may be a variation of a tracing JIT compiler, modified to conduct AOT compilation of source code based on tracing information related to a past execution of the code in a different environment.

While the compiler 162 and management software 284 are shown in FIG. 2 as part of the acceleration system 160, in other embodiments, all or a portion of the compiler 162 and management software 284 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the acceleration system 160.

In some embodiments, the acceleration system 160 may further include components other than those illustrated in FIG. 2. For example, the memory 280 may further include an instance allocation unit for allocating execution environments to tasks, user code execution unit to facilitate execution of tasks within the execution environments, or a container manager for managing creation, preparation, and configuration of containers within virtual machine instances.

Figure 3:
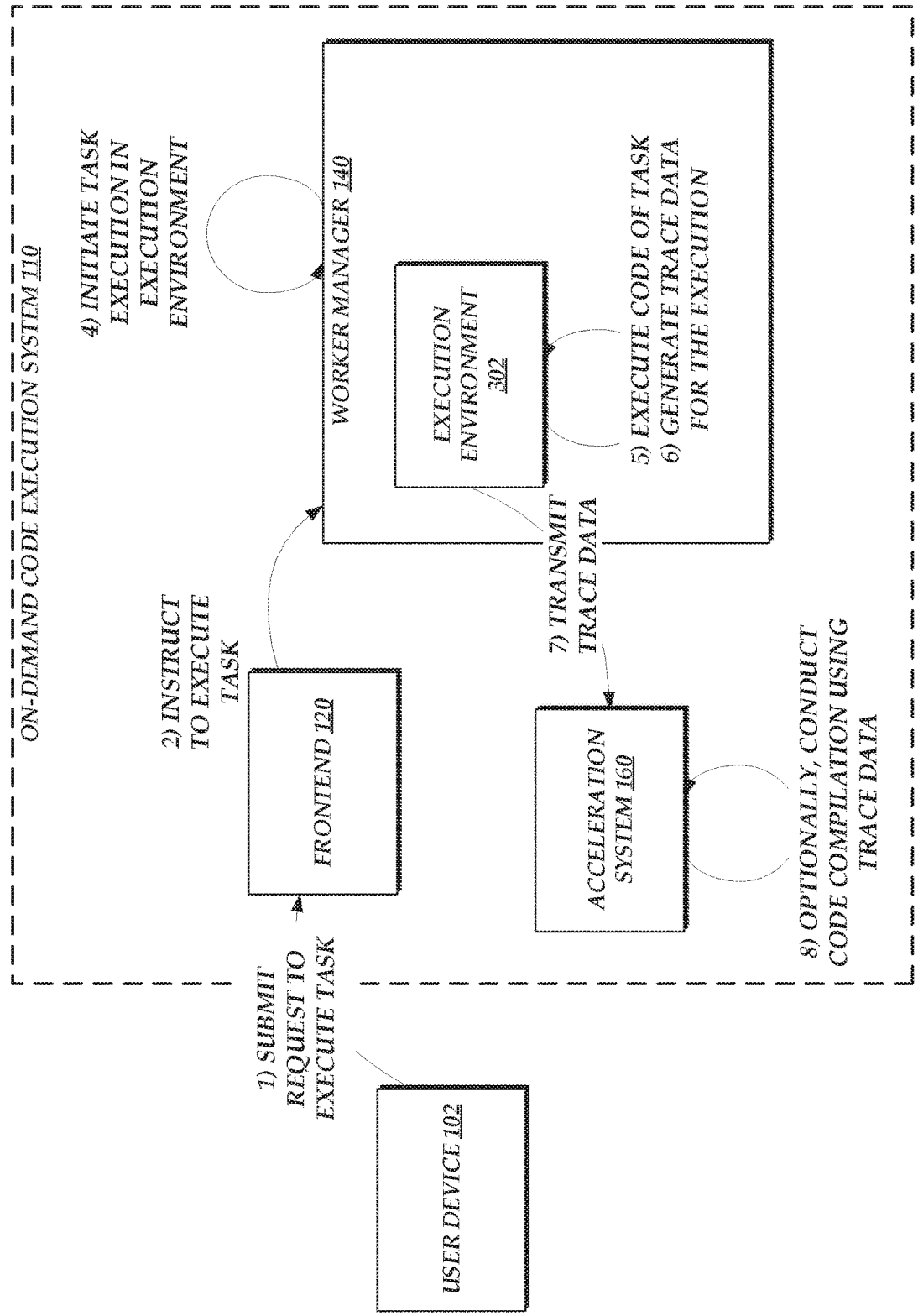
FIG. 3 is a flow diagram depicting illustrative interactions for collecting trace information during execution of source code within a first execution environment and submitting that trace information to the acceleration system of FIG. 1, which may use that trace information to conduct assistant ahead-of-time (AOT) compilation for the source code.

With reference to FIG. 3, illustrative interactions are depicted in which the on-demand code execution system 110 generates trace information regarding execution of a task within a first execution environment 302 and stores the information at an acceleration system 160. As discussed in more detail below, the trace information may thereafter be used to assist in execution of the task within other execution environments.

The interactions of FIG. 3 begin at (1), where a user device 102 submits a request to the frontend 120 to execute the task. Submission of a request may include transmission of specialized data to the frontend 120, such as a HTTP packet or API call referencing the task. While the interactions of FIG. 3 are described as including an explicit request to execute the task by the user device 102, requests to execute the task may occur in a variety of manners, including submission of a call by auxiliary services 106 (not shown in FIG. 3A) or generation of a call by the on-demand code execution system 110 (e.g., based on a rule to call the alias when specific criteria are met, such as elapsing of a period of time or detection of data on an auxiliary service 106). The request may include any information required to execute the task, such as parameters for execution, authentication information under which to execute the task or to be used during execution of the task, etc.

At (2), frontend 120 instructs a worker manager 140 to execute the task. While not shown in FIG. 3, in some instances the frontend 120 may perform additional operations prior to instructing a worker manager 140 to execute a task, such as determining whether sufficient capacity exists to execute the task, queuing the task, determining accounts to which to attribute execution of the task, etc. Such operations are described in more detail in the '556 Patent.

At (4), the worker manager 140 then initiates execution of the task within an execution environment. Execution of tasks is described in more detail within the in the '556 Patent. However, in brief, the worker manager 140 may generate an execution environment (e.g., software container or virtual machine instance) in which to execute the task, provision the execution environment with code required to execute the task (e.g., source code of the task, a runtime system for that source code, etc.), and initiate execution of the task within the environment. In accordance with embodiments of the present disclosure, the execution environment may be provisioned with a tracing JIT compiler which operates, during execution of the task, to trace that execution and generate tracing information therefrom.

Accordingly, at (5), the execution environment 302 begins execution of the task. Execution of the task may include, for example, interpretation or compilation of source code (which may include an intermediate representation of the source code, such as bytecode) into machine code that is executed within the environment 302. Additionally, at (6), the execution environment (e.g., via operation of a tracing JIT compiler) generates trace data for the execution. Generally described, tracing information monitors an execution path within code, including details such as loops which occur within the code, functions called in the code, the frequency of such loops or calls, and the like. Tracing may additionally include information such as type information for data objects whose type is determined at runtime (e.g., dynamically, as opposed to statically, typed objects). Collection of trace information via a tracing JIT compiler is known in the art, and thus will not be described in detail herein. However, in contrast to traditional operation of a tracing JIT compiler, the tracing information, in accordance with embodiments of the present disclosure, the may be persisted between executions of code, and transmitted from the execution environment 302 for use in other execution environments.

Specifically, at (7), the execution environment transmits the trace data to the acceleration system 160. In one embodiment, interaction (7) occurs at the end of execution of the task within the execution environment. In another embodiment, interaction (7) occurs when the execution environment 302 determines that sufficient tracing information has been collected to accurately represent execution of the code. The amount of information to accurately represent code may be established, for example, by a designer of the tracing JIT compiler, or by an administrator of the on-demand code execution system 110. The amount of information may be specified, for example, as a size of the information (e.g., n bytes), a total runtime reflected in the tracing information (e.g., n seconds), an amount of loops monitored within the information (e.g., n loops), a combination thereof, etc.

As will be discussed below, the tracing information generated within the execution environment 302 may thereafter be used to assist in execution of the task within other environments, such as by "jump starting" operation of a tracing JIT compiler within the other environments. As such, the tracing information may reduce or eliminate the typical JIT warmup period for subsequent environments. The acceleration system 160 may therefore store the tracing information as optimization information for the task within the optimization information data store 168.

As an additional improvement, the acceleration system 160 may additionally or alternatively utilize the tracing information to conduct AOT compilation for the task, in a manner that obtains many benefits of traditional tracing-based JIT compilation within an AOT compilation context. Specifically, the acceleration system 160 may utilize the tracing information of the execution environment 302 to conduct AOT compilation for source code of the task, while applying optimizations which traditionally are applied during JIT compilation (and which are traditionally unavailable during AOT compilation). Such optimizations include (but are not limited to) constant sub-expression elimination, dead-code elimination, register allocation, and loop-invariant code motion. Each of these optimizations is known in the art, and thus will not be described in detail herein. However, generally described, constant sub-expression elimination is an optimization in which a number of instances of an identical expression within code are replaced by a single variable holding a computed value (thus, e.g., reducing duplicative calculation but increasing the number of variables during execution). Dead-code elimination, in brief, is an optimization in which code known not to affect program results, such as unreachable code, is removed (or "elided"). Register allocation, in brief, is the process of optimizing allocation of variables to registers of a central processing unit ("CPU"), as opposed to more slowly accessed memories of an environment. Loop-invariant code motion, in brief, is the process of relocating statements or expressions from within a loop of code to outside that loop, when doing so does not affect program results (e.g., the statements or expressions do not vary during implementation of the loop). Each of the above-noted optimizations may generally rely on or be improved by tracing information for the task. For example, the above-noted optimizations may have varying effect (and thus, actually increase the speed or efficiency at which code executes) based on how code executes in practice. Thus, by use of the tracing information received from the execution environment 302, the acceleration system 160 may determine which optimizations should be applied during AOT compilation of the code. In some instances, the acceleration system 160 may determine which portions of the source code should be compiled into machine code in an AOT manner, as opposed to being left in their source code form and interpreted during execution. For example, the acceleration system 160 may determine that a highly invariant portion of code (e.g., a common execution path) should be compiled into machine code, while a highly variant portion of code (e.g., where the execution path diverges) should be left uncompiled. The acceleration system 160 may thereafter store the compiled machine code as optimization information for the task within the optimization information data store 168.

Figure 4:
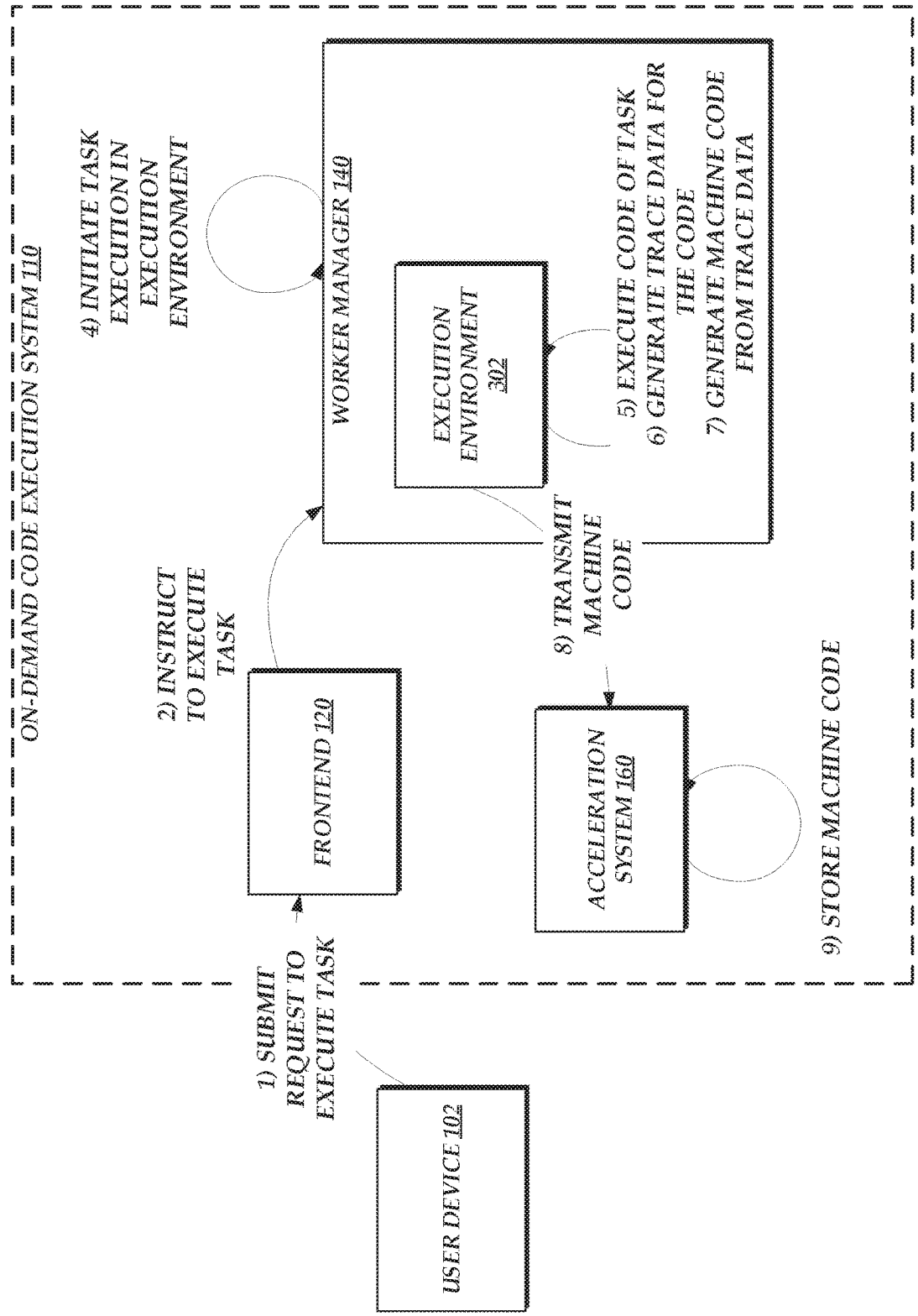
FIG. 4 is a flow diagram depicting illustrative interactions for generating machine code based on application of a just-in-time (JIT) compiler to source code executing within a first execution environment and submitting that machine code to the acceleration system of FIG. 1.

With reference to FIG. 4, additional or alternative interactions to those of FIG. 3 for generating optimization information at the on-demand code execution system 110 will be described. Specifically, while the interactions of FIG. 3 relate to collection of tracing information from an execution environment 302, and to potentially conducting AOT compilation for source code of a task based on the tracing information, the interactions of FIG. 4 relate to extraction from the execution environment 302 of machine code generated by a tracing JIT compiler operating within the execution environment 302. In traditional operation, a tracing JIT compiler operates during execution of source code to generate machine code for portions of the source code. During generation of that machine code, a variety of optimizations (such as those discussed above) may be applied to the compilation process. However, the machine code generated by a traditional tracing JIT compiler is generally not made available outside of the execution environment in which the tracing JIT compiler operates, and typically is not maintained between executions of code. Thus, each time code is executed, the tracing JIT compiler must repeat it's "warm up" phase, recreating machine code from source code. This operation may be acceptable in environments with disparate execution environments, since the machine code generated by a tracing JIT compiler for a first execution environment may be unlikely to perform property when executed in a second execution environment. However, in the case of the on-demand code execution system 110, the system 110 can be configured to generate numerous environments with similar or identical architectures, such that machine code generated in a first execution environment will function when executed in a second execution environment. Thus, in accordance with embodiments of the present disclosure, it may be desirable to enable machine code generated by a tracing JIT compiler of a first execution environment to be extracted from that environment and stored for later use in other execution environments.

The initial interactions of FIG. 4—specifically, interactions (1) through (6)—are similar to those described above with reference to FIG. 3, and thus will not be re-described. However, in contrast to the interactions depicted in FIG. 3, at interaction (7) of FIG. 4, the execution environment 302 (e.g., via operation of a tracing JIT compiler) generates machine code from source code of the task, based on the tracing information generated regarding the execution environment 302. (While generation of machine code is not depicted as an interaction of FIG. 3, one skilled in the art will appreciate that a tracing JIT compiler within the execution environment 302 of FIG. 3 may nevertheless operate to generate machine code in addition to the interactions depicted in FIG. 3. Thus, the interactions of FIGS. 3 and 4 may be complimentary to one another, and in some instances occur concurrently.) During generation of machine code, the tracing JIT compiler may apply any number of optimizations based on tracing information, such as those noted above. Thereafter, at (8), the execution environment 302 transmits the machine code to the acceleration system 160. The acceleration system 160 may thereafter store the compiled machine code as optimization information for the task within the optimization information data store 168, such that other execution environments executing the task may utilize the machine code generated within the execution environment 302.

Figure 5:
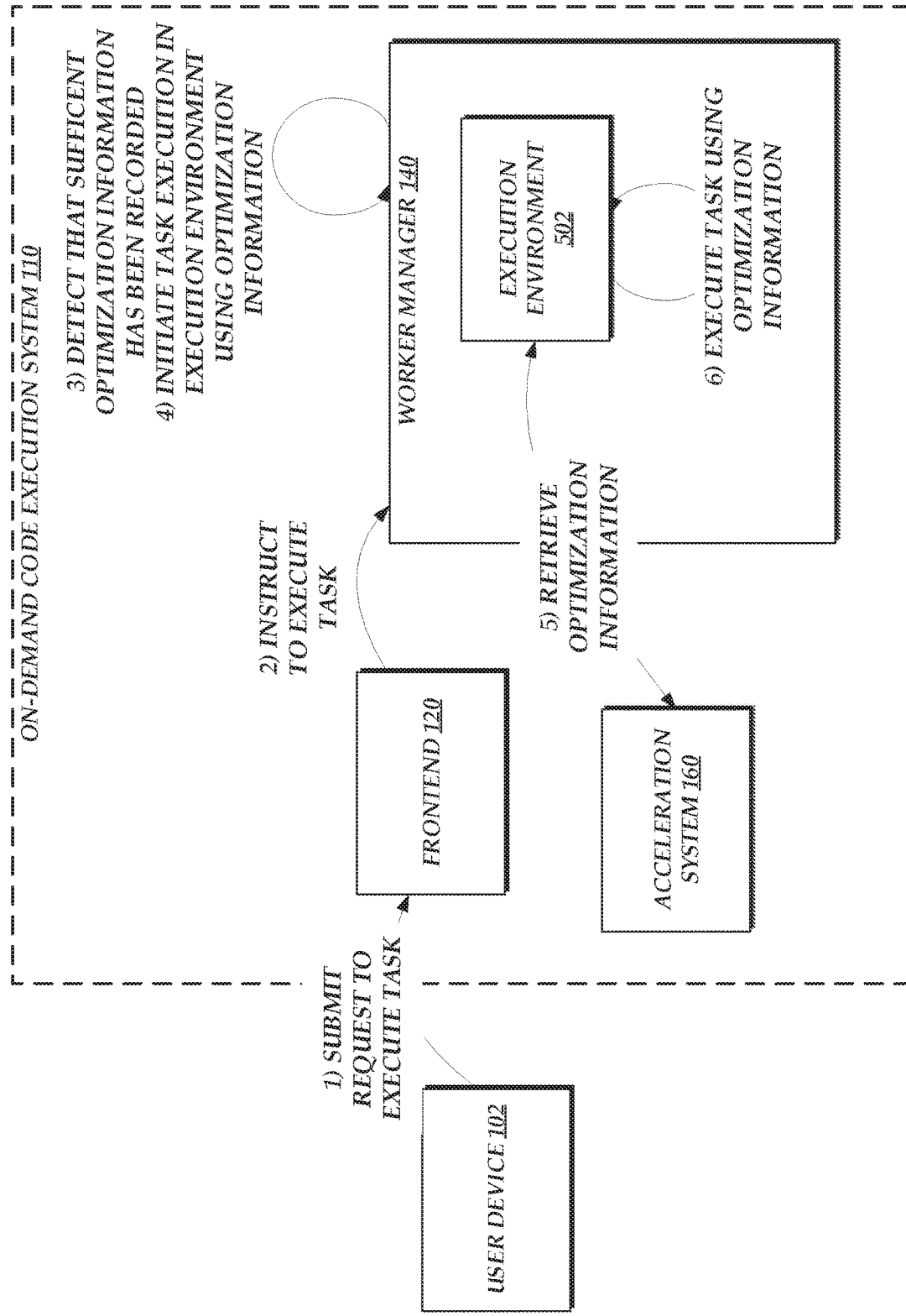
FIG. 5 is a flow diagram depicting the use of optimization information, such as tracing information or machine code collected with respect to execution of source code in a first execution environment, to improve code execution in a second execution environment.

With reference to FIG. 5, illustrative interactions are depicted for the utilization of optimization information to enable efficient execution of a task within an execution environment 502, based on optimization information generated as a result of a prior execution in another execution environment (e.g., the environment 302 of FIGS. 3 and 4). Like the interactions of FIGS. 3 and 4, the interactions of FIG. 5 begin with a request to execute a task at the on-demand code execution system, which is passed through the frontend 120 and causes an instruction to the worker manager 140 to execute the task, as shown in interactions (1) and (2) of FIG. 5. These interactions are similar to the corresponding interactions of FIGS. 3 and 4 and thus will not be re-described.

The interactions of FIG. 5 continue at (3) where the worker manager 140 detects that sufficient optimization information has been recorded to assist in execution of the task. While not shown in FIG. 5, detecting that sufficient optimization information has been recorded may include communication with the acceleration system to determine what optimization information (if any) has been stored at that system 160. The amount of optimization information needed to assist in execution of a task may be set, for example, by an administrator of the on-demand code execution system 110, a developer of the runtime system in which the task will execute, a user who has submitted the task, or the like. The amount of information may be specified, for example, as a size of the information (e.g., n bytes), a total runtime reflected in the information (e.g., n seconds), an amount of loops monitored within the information (e.g., n loops), a combination thereof, etc. In one embodiment, the existence of optimization information within the acceleration system 160 may be deemed sufficient. In some instances, the acceleration system 160 may be configured to store multiple types of optimization information for a given task, and the sufficiency of information may depend at least in part on the type of information stored. For example, the acceleration system 160 may store tracing information based at least partly on conditions under which the tracing information was collected (e.g., numbers, types, or values of parameters passed to the task execution). The worker manager 140 may thus determine whether sufficient optimization information is stored within the acceleration system 160 that matches or corresponds to conditions for a current execution (e.g., the same number of parameters, types of parameters, parameter values, combinations thereof, etc.). As another example, the acceleration system 160 may store machine code based at least partly on the architecture (e.g., CPU type, operating system, etc.) for which the machine code was generated. The worker manager 140 may thus determine whether sufficient optimization information is stored within the acceleration system 160 that matches or corresponds to an architecture of the execution environment 502 for a current execution.

After detecting that sufficient optimization information has been detected, the interactions of FIG. 5 continue at (4), where the worker manager 140 initiates execution of the task in the execution environment 502 using the optimization information. Accordingly, at (5), the execution environment 502 retrieves the optimization information from the acceleration system 160. As noted above, the optimization information may include, for example, tracing information related to prior execution of the task (e.g., within a different environment) or machine code generated based on such tracing information (which machine code may be generated by, for example, a tracing JIT compiler during the prior execution, or by an AOT compiler which applied optimizations based on the tracing information). Thereafter, at (6), the execution environment executes the task using the optimization information. Illustratively, where the optimization information includes tracing information, execution of the task using the optimization information may include loading the tracing information by a tracing JIT compiler, in a manner similar to how a traditional tracing JIT compiler may operate after tracing information has been generated within a local environment. Thus, the tracing JIT compiler may be enabled to skip or greatly reduce its own tracing step, enabling rapid optimization of JIT compiled code. Where the optimization information includes machine code, execution of the task using the optimization information may include direct utilization of the machine code to execute the task, as opposed to use of source code for the task. Thus, use of machine code may greatly reduce or even eliminate the need to conduct JIT compilation for the task.

While the interactions of FIGS. 3-5 are described with respect to two execution environments (environments 302 and 502), one skilled in the art will appreciate that these interactions have been simplified for ease of description. For example, in some embodiments, optimization information generated in multiple execution environments may be utilized to enable efficient execution of a task in another environment. The optimization information may be generated at different times, concurrently, or any combination thereof. The optimization information may be stored at the acceleration system for use by subsequent environments. In some instances, the acceleration system may aggregate the optimization information from multiple environments. In other instances, the acceleration system may store the optimization information for multiple environments separately, and a subsequent environment may retrieve multiple items of optimization information. In some instances, a subsequent environment may retrieve and utilize a most recent set of optimization information, as the total amount of optimization information within the acceleration system 160 may be more than is needed to efficiently execute the task. The amount of most recent optimization information may be equal, for example, to the amount of optimization information designated as sufficient to enable efficient execution of the task.

As another variation on the interactions described above, in some instances optimization information from a first version of a task may be utilized in accordance with the above-described interactions to enable efficient execution of a second version of a task. Versions of a task may correspond, for example, to alterations in source code for the task over time (e.g., where a first version is the first set of code for the task uploaded, a second version is a modification to that code, etc.). In some cases, the alterations between versions of a task may be relatively minor, and have little or no effect on optimization information for the task. For example, a modification may be made to a relatively unused portion of code, and thus tracing information for a new version of the task may be expected to be similar or identical to tracing information for an older version. Accordingly, in some embodiments, the on-demand code execution system 110 may be configured to provision an execution environment for executing a new version of a task with optimization information generated by virtue of a past execution of a past version of the task. Because optimization information generally includes "fallback" provisions, such that execution of code can continue even where the optimization information is incorrect (albeit more slowly, as the source code for the task must generally be interpreted for the functions for which the optimization information failed), use of optimization information across versions of the same task would not be expected to inhibit execution of the new version of the task.

Figure 6:
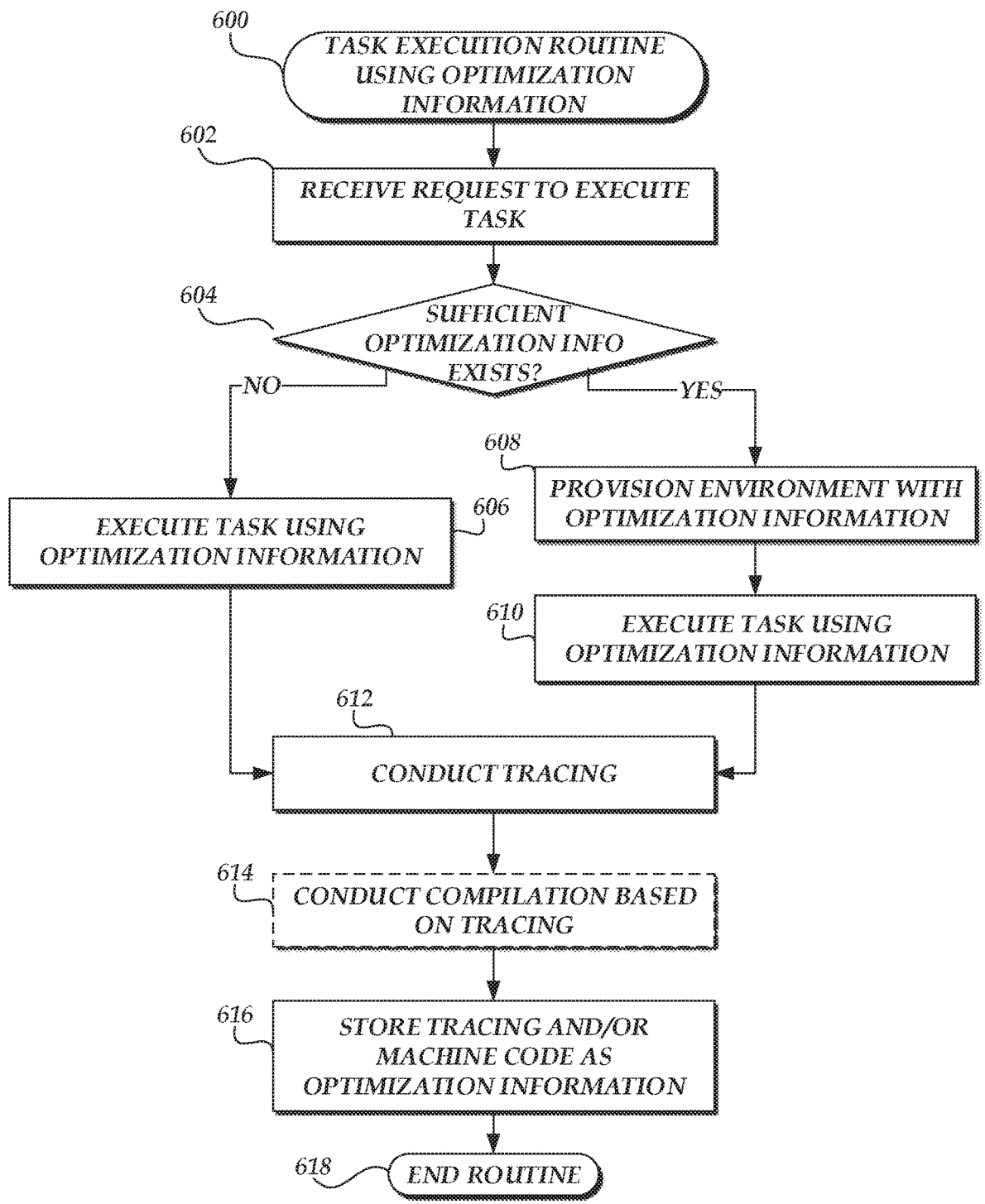
FIG. 6 is a flow chart depicting an illustrative routine for enabling cross-environment application of tracing information for code of tasks on the on-demand code execution system of FIG. 1.

With reference to FIG. 6, an illustrative routine 600 will be described for enabling cross-environment application of tracing information for improved code execution within the on-demand code execution system 110. The routine 600 may be implemented, for example, by a worker manager 140 of the system 110 in conjunction with the acceleration service 160.

The routine 600 begins at block 602, where a request to execute a task on the system 110 is received. As noted above, the request may be generated, for example, based on an API call received at the system 110. The amount of information required for sufficiency may be specified, for example, as a size of the information (e.g., n bytes), a total runtime reflected in the tracing information (e.g., n seconds), an amount of loops monitored within the information (e.g., n loops), a combination thereof, etc. Implementation of block 604 may include communication between the worker manager 140 and the acceleration system 160, for example to determine what optimization information exists for the task within the acceleration system 160. Implementation of block 604 may further include determining which of the optimization information for the task is applicable to the current execution. For example, implementation of block 604 may include determining whether the optimization information within the system 160 was created based on a task execution under the same or similar parameters (e.g., the same number and/or type of parameters), based on task execution within the same architecture, or the like.

Thereafter, implementation of the routine 600 varies according to whether sufficient optimization information exists. Where sufficient optimization information does not exist, the routine 600 continues to block 606, where execution occurs without the benefit of optimization information (e.g., in a traditional manner). Alternatively, where sufficient optimization information does exist, the routine 600 continues to block 608, where an execution environment is provisioned with the optimization information. Illustratively, tracing information from one or more past task executions may be provisioned into the environment, such that a tracing JIT compiler can utilize the tracing information to conduct optimization JIT compilation for source code of the task. As another illustration, machine code generated for the task (e.g., by a tracing JIT compiler or by an AOT compiler operating with the benefit of past tracing information) may be placed into the environment, such that the task can be executed at least partially via the machine code, reducing or eliminating the need to compile or interpret source code of the task. Thereafter, at block 610, execution of the code proceeds with the benefit of the optimization information. Thus, execution of the code is expected to proceed more quickly and/or efficiently, without requiring that the execution environment in which the code is executed itself generate the optimization information.

In either instance, the routine 600 then proceeds to block 612 where, during execution, tracing information is collected. This tracing information may then be used as or to generate additional optimization information, enabling subsequent executions of the task to benefit from the additional optimization information. The tracing information may be collected, for example, via operation of a tracing JIT compiler within the execution environment for the task execution.

Optionally, at block 614, compilation of source code for the task may be conducted based on the available tracing information, which may include both tracing information collected for a current execution as well as other tracing information provisioned into the environment (e.g., as optimization information generated by virtue of past task executions). In one embodiment, the compilation of block 614 is conducted by a tracing JIT compiler operating in an execution environment for the task, and thus represents JIT compilation for source code of the task. In another embodiment, the compilation of block 614 is conducted by a compiler 162 of the acceleration service 160 as an AOT compilation process. In either instance, the compilation can result in machine code usable to speed subsequent executions of the task.

At block 616, the optimization information generated by virtue of the routine 600, which may include tracing information related to a current execution or machine code generated based on that tracing information (e.g., via JIT or AOT compilation), is stored at block 616. Thus, subsequent implementations of routine 600 can benefit from this optimization information.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to implement cross-environment application of tracing information for a task on an on-demand code execution system, wherein the task corresponds to code executable to implement the task, the system comprising:
   a physical data store storing the code for the task;
   one or more computing devices implementing a first execution environment on the on-demand code execution system, the one or more computing devices implementing the first execution environment configured to:
      initiate a first execution of the code within the first execution environment;
      trace the first execution of the code to generate tracing information for the first execution, the tracing information reflecting at least an execution path for the first execution; and
      store the tracing information for the first execution; and
   one or more computing devices implementing a second execution environment on the on-demand code execution system that is different from the first execution environment, the one or more computing devices implementing the second execution environment configured to:
      provision the second execution environment with the tracing information for the first execution within the first execution environment; and
      initiate a second execution of the code within the second execution environment, wherein the second execution utilizes a tracing just-in-time (HT) compiler, operating to compile portions of the code selected based at least partly on the tracing information for the first execution within the first execution environment, to reference the tracing information of the first execution environment for the second execution.

2. The system of claim 1, wherein the one or more computing devices implementing the second execution environment are further configured to trace the second execution of the code to generate tracing information for the second execution, and wherein the system further comprises:
   one or more computing devices implementing a third execution environment on the on-demand code execution system, the one or more computing devices implementing the third execution environment configured to:
      provision the third execution environment with the tracing information for the second execution within the second execution environment; and
      initiate a third execution of the code within the third execution environment, wherein the third execution utilizes a tracing just-in-time (JIT) compiler of the third environment operating to compile portions of the code selected based at least partly on the tracing information for the second execution within the second execution environment.

3. The system of claim 1, wherein the one or more computing devices implementing the first execution environment are further configured to compile the code based at least partly on the tracing information for the first execution to result in machine code, and wherein the second execution of the code relies at least in part on execution of the machine code.

4. The system of claim 1 further comprising one or more computing devices implementing an ahead-of-time (AOT) compiler, wherein the one or more computing devices implementing the AOT compiler are configured to generate machine code for the code based at least partly on the tracing information, and wherein the second execution of the code relies at least in part on execution of the machine code.

5. The system of claim 1, wherein the one or more computing devices implementing the first execution environment and the one or more computing devices implementing the second execution environment are the same one or more computing devices.

6. A computer-implemented method comprising:
within a first execution environment on an on-demand code execution system:
initiating a first execution of code within the first execution environment;
tracing the first execution of the code to generate tracing information for the first execution, the tracing information reflecting at least an execution path for the first execution; and
storing the tracing information for the first execution;
provisioning a second execution environment on the on-demand code execution system with the tracing information for the first execution within the first execution environment, the second execution environment being different from the first execution environment; and
initiating a second execution of the code within the second execution environment on the on-demand code execution system, wherein the second execution utilizes a tracing just-in-time (JIT) compiler, operating to compile portions of the code selected based at least partly on the tracing information for the first execution within the first execution environment, to reference the tracing information of the first execution environment for the second execution.

7. The computer-implemented method of claim 6, wherein the first execution environment corresponds to at least one of a software container or a virtual machine instance.

8. The computer-implemented method of claim 6, wherein the on-demand code execution system is configured to generate the first execution environment in response to a request to execute the code and to deconstruct the first execution environment after the first execution completes.

9. The computer-implemented method of claim 6, wherein tracing the first execution of the code comprises implementing the tracing JIT compiler within the first execution environment.

10. The computer-implemented method of claim 6 further comprising:
generating, based at least partly on the tracing information, machine code; and
provisioning the second execution environment with the machine code;
wherein the second execution is implemented at least partly based on the machine code.

11. The computer-implemented method of claim 10, wherein the machine code is generated via the tracing JIT compiler operating within the first execution environment.

12. The computer-implemented method of claim 10, wherein the machine code is generated via an AOT compiler operating outside the first execution environment.

13. The computer-implemented method of claim 6 further comprising provisioning the first execution environment with tracing information reflecting an execution path during at least one prior execution of the code.

14. The computer-implemented method of claim 6 further comprising provisioning the second execution environment with tracing information for an additional execution of the code that occurred at least partially concurrently with the first execution.

15. Non-transitory computer-readable media comprising instructions executable by a computing system to:
initiate a first execution of code within a first execution environment on an on-demand code execution system;
trace the first execution of the code to generate tracing information for the first execution within the first execution environment, the tracing information reflecting at least an execution path for the first execution; and
store optimization information for the code generated based at least partly on the tracing information for first execution, wherein the optimization information includes at least one of the tracing information or machine code generated by compiling the code based at least partly on the tracing information;
provision a second execution environment on the on-demand code execution system with the optimization information generated based at least partly on the tracing information for the first execution within the first execution environment, the second execution environment being different from the first execution environment; and
execute the code within the second execution environment based at least partly on the optimization information, wherein the second execution utilizes a tracing just-in-time (JIT) compiler, operating to compile portions of the code selected based at least partly on the tracing information for the first execution within the first execution environment, to reference the tracing information of the first execution environment for the second execution.

16. The non-transitory computer-readable media of claim 15, wherein the instructions are further executable by the computing system, prior to provisioning the second execution environment with the optimization information, to determine the optimization information is sufficient to be utilized in the second execution environment, and wherein sufficiency of the optimization information is based at least partly on at least one of a data size of the optimization information, a length of execution reflected in the optimization information, or a number of execution loops reflected in the optimization information.

17. The non-transitory computer-readable media of claim 15, wherein optimization information includes the tracing information, and where the computing system executes the code within the second execution environment at least partly by applying an optimization to a JIT compilation occurring during the execution of the code within the second execution environment.

18. The non-transitory computer-readable media of claim 17, wherein the optimization is at least one of sub-expression elimination, dead-code elimination, register allocation, or loop-invariant code motion.

19. The non-transitory computer-readable media of claim 15, wherein the instructions are further executable by the computing system, prior to provisioning the second execution environment with the optimization information, to determine that the optimization information for the code is applicable to the second execution environment.

20. The non-transitory computer-readable media of claim 15, wherein to determine that the optimization information for the code is applicable to the second execution environment the instructions are executable by the computing system to conduct at least one of:
- a comparison of parameters passed to the first execution environment and parameters passed to the second execution environment; or
- a comparison of an architecture of the first execution environment and an architecture of the second execution environment.

* * * * *

UNITED STATES PATENT AND TRADEMARK OFFICE
CERTIFICATE OF CORRECTION

PATENT NO. : 10,649,749 B1  
APPLICATION NO. : 16/019384  
DATED : May 12, 2020  
INVENTOR(S) : Marc John Brooker Page 1 of 1

It is certified that error appears in the above-identified patent and that said Letters Patent is hereby corrected as shown below:

In the Claims

In Column 30, Line 38, Claim 1, delete "(HT)" and insert --(JIT)--.

Signed and Sealed this  
First Day of September, 2020

Andrei Iancu  
*Director of the United States Patent and Trademark Office*